(12) United States Patent
Blyberg

(10) Patent No.: US 9,414,691 B2
(45) Date of Patent: Aug. 16, 2016

(54) SYSTEM FOR KEEPING A PILLOW IN PLACE

(71) Applicant: Venke Cecilie Blyberg, Santa Monica, CA (US)

(72) Inventor: Venke Cecilie Blyberg, Santa Monica, CA (US)

(73) Assignee: Venke Blyberg, Santa Monica, CA (US)

( * ) Notice: Subject to any disclaimer, the term of this patent is extended or adjusted under 35 U.S.C. 154(b) by 0 days.

(21) Appl. No.: 14/645,305

(22) Filed: Mar. 11, 2015

(65) Prior Publication Data

US 2015/0265062 A1    Sep. 24, 2015

Related U.S. Application Data

(60) Provisional application No. 61/955,424, filed on Mar. 19, 2014.

(51) Int. Cl.
| | | |
|---|---|---|
| A47C 21/02 | (2006.01) | |
| F16B 45/00 | (2006.01) | |
| B60N 2/48 | (2006.01) | |
| A47C 7/38 | (2006.01) | |

(52) U.S. Cl.
CPC .............. *A47C 21/026* (2013.01); *A47C 7/383* (2013.01); *B60N 2/4805* (2013.01); *B60N 2/4879* (2013.01); *F16B 45/00* (2013.01)

(58) Field of Classification Search
CPC ..... A47G 7/383; A47G 29/08; A47G 29/083; A47G 33/1246; A47C 20/02; A47C 13/28; A47C 7/383; A47C 21/026; B60N 2/4805; B60N 2/4879; A45F 5/10; A45F 5/102; A45F 2005/1013; A45F 2005/1006; B65D 33/06; F16B 45/00; F16B 45/02; A47F 5/0006
USPC ......... 248/317, 322, 327, 339, 340, 328, 320, 248/301, 304
See application file for complete search history.

(56) References Cited

U.S. PATENT DOCUMENTS

| | | | | |
|---|---|---|---|---|
| 1,490,066 A | * | 4/1924 | Carr Legatee ............. | A45F 3/14 182/3 |
| 2,084,243 A | * | 6/1937 | Charles ...................... | A61J 9/06 24/115 A |
| 2,288,692 A | * | 7/1942 | Fearson ................ | B60R 22/105 24/302 |
| 2,585,398 A | * | 2/1952 | McIlwraith .............. | B60N 2/62 24/339 |
| 2,658,556 A | * | 11/1953 | Homer .................... | A47D 1/103 248/327 |
| 4,068,817 A | * | 1/1978 | Berger ...................... | G09F 7/22 248/303 |
| 4,082,241 A | * | 4/1978 | Burkey ................ | A63B 29/024 24/115 R |
| 4,091,976 A | * | 5/1978 | Morse ................ | A47G 25/1442 206/279 |
| 4,796,762 A | * | 1/1989 | Law ...................... | A47B 81/005 211/117 |
| 4,858,867 A | * | 8/1989 | King ..................... | A47G 29/087 206/289 |
| 5,274,933 A | * | 1/1994 | Cole ......................... | A43B 3/00 36/136 |
| 5,459,903 A | * | 10/1995 | Treacy ...................... | A61J 9/06 24/115 G |

(Continued)

*Primary Examiner* — Nkeisha Smith
(74) *Attorney, Agent, or Firm* — Plager Schack LLP.; Kara Verryt

(57) ABSTRACT

Some embodiments of the present disclosure include a system for holding a pillow in place. The system may include a pair of stabilizers. Each stabilizer may be a cord having a first end, a central portion, and a second end, wherein the first end of the cord includes a rigid hook extending partially along the length of the cord and the second end of the cord engages with the central portion via a fastener, creating a loop. Each end of the cord may have a tip attached thereto. The loop may be configured to accommodate a pillow, and the rigid hook may be configured to engage with a seat, resulting in the system providing a mechanism for suspending a pillow from a seat while simultaneously stabilizing the pillow at a desired location, such as around a user's neck.

6 Claims, 3 Drawing Sheets

(56) References Cited

U.S. PATENT DOCUMENTS

| | | | | |
|---|---|---|---|---|
| 5,664,754 A * | 9/1997 | Gaenslen | E04B 9/006 | 248/300 |
| 5,765,564 A * | 6/1998 | Ewing | A61G 7/0755 | 128/845 |
| 5,918,332 A * | 7/1999 | Dees | A47G 9/1045 | 383/4 |
| 6,003,210 A * | 12/1999 | Facey | F16G 11/04 | 24/130 |
| 6,029,830 A * | 2/2000 | Manookian | A47F 5/083 | 211/118 |
| 6,131,780 A * | 10/2000 | Becker | A45F 3/04 | 224/148.6 |
| 6,443,338 B1 * | 9/2002 | Giacona, III | A45C 13/30 | 224/148.6 |
| 6,863,249 B1 * | 3/2005 | Alvord | B60R 9/02 | 248/208 |
| 7,810,655 B2 * | 10/2010 | Wang | A47B 43/006 | 108/149 |
| 8,439,775 B2 * | 5/2013 | Stephenson | A63B 63/004 | 473/477 |
| 9,102,276 B1 * | 8/2015 | Virgin | B60R 7/043 | |
| 2001/0001340 A1 * | 5/2001 | Libecco | B60P 7/0823 | 24/300 |
| 2002/0164940 A1 * | 11/2002 | Maxwell | A22B 5/161 | 452/125 |
| 2004/0079843 A1 * | 4/2004 | Medwed | A61J 9/06 | 248/104 |
| 2005/0039310 A1 * | 2/2005 | Borne | F16G 11/00 | 24/300 |
| 2007/0052274 A1 * | 3/2007 | Morphew | B60N 2/7005 | 297/392 |
| 2011/0198469 A1 * | 8/2011 | Chen | A47G 25/0614 | 248/304 |
| 2013/0119716 A1 * | 5/2013 | Stronconi | B60N 2/4805 | 297/180.1 |
| 2014/0116585 A1 * | 5/2014 | Kimmel | A45F 5/10 | 150/106 |
| 2015/0074953 A1 * | 3/2015 | Dershem | F16G 11/14 | 24/301 |

* cited by examiner

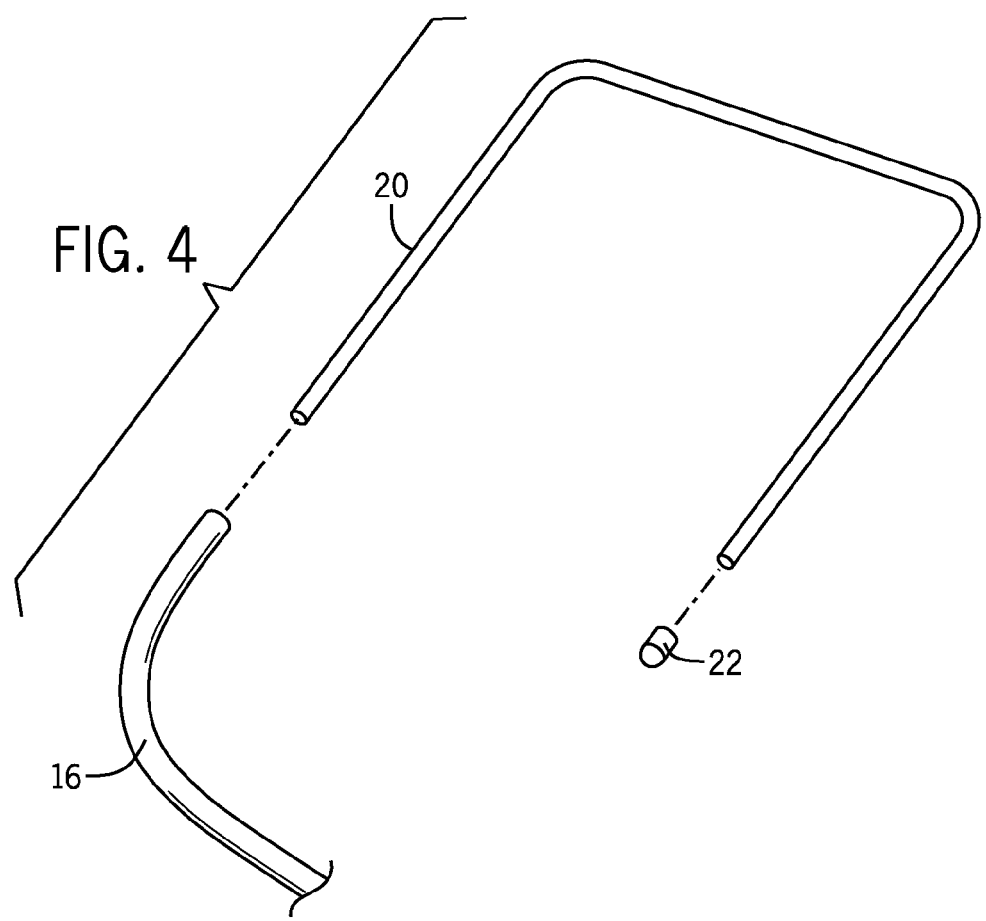
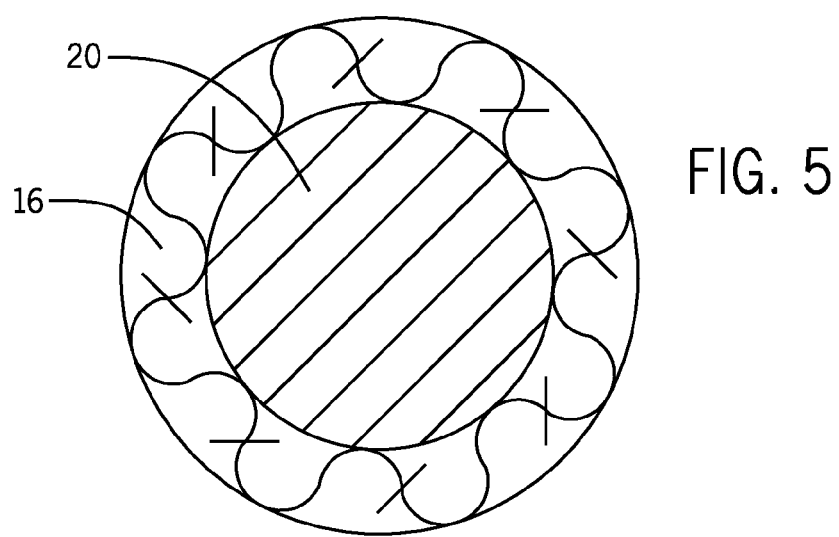

SYSTEM FOR KEEPING A PILLOW IN PLACE

RELATED APPLICATION

This application claims priority to provisional patent application U.S. Ser. No. 61/955,424 filed on Mar. 19, 2014, the entire contents of which is herein incorporated by reference.

BACKGROUND

The embodiments described herein relate generally to travel accessories, and more particularly, to a system for keeping a pillow in place when traveling or seated.

Today's society is a very mobile society. People are constantly traveling from one location to another by train, plane, and automobile. Oftentimes people fall asleep while traveling, which is particularly desirable on long trips. However, some people have trouble falling asleep because the seat they are sitting in may not be particularly comfortable for sleeping. Thus, many travelers use pillows, particularly neck pillows, which wrap around a users neck to increase their comfort while trying to sleep while sitting up. However, the movement of the vehicle or the movement caused by falling asleep, such as dipping forward or to the side with the head and shoulders, may cause their heads and/or pillow to move.

Therefore, what is needed is a system that keeps a user's pillow in place while the user is sitting up to aid the user in getting a better rest.

SUMMARY

Some embodiments of the present disclosure include a system for holding a pillow in place. The system may include a pair of stabilizers. Each stabilizer may be a cord having a first end, a central portion, and a second end, wherein the first end of the cord includes a rigid hook extending partially along the length of the cord and the second end of the cord engages with the central portion via a fastener, creating a loop. Each end of the cord may have a tip attached thereto. The loop may be configured to accommodate a pillow, and the rigid hook may be configured to engage with a seat, resulting in the system providing a mechanism for suspending a pillow from a seat while simultaneously stabilizing the pillow at a desired location, such as around a user's neck.

BRIEF DESCRIPTION OF THE FIGURES

The detailed description of some embodiments of the invention is made below with reference to the accompanying figures, wherein like numerals represent corresponding parts of the figures.

FIG. 4 is an exploded perspective view of one embodiment of the present invention.

FIG. 5 is a cross-sectional view of one embodiment of the present invention, taken along line 5-5 of FIG. 2.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to stabilize a user's pillow while the user is sitting up and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Bracket
2. Cord
3. Cord Clamps

The various elements of the pillow support system for stabilizing a user's pillow of the present disclosure may be related in the following exemplary fashion. It is not intended to limit the scope or nature of the relationships between the various elements and the following examples are presented as illustrative examples only.

By way of example, and referring to FIGS. 1-5, some embodiments of the pillow support system for stabilizing a pillow in place of the present disclosure comprise at least one stabilizer 10 having a proximal end and a distal end, the proximal end comprising a hook and the distal end comprising a loop. For example, in some embodiments, the stabilizer 10 comprises a cord 16 having a bracket 20 inserted into a first end thereof, the bracket 20 extending partially about the length of the cord 16, wherein a second end of the cord does not have a bracket positioned therein, the first end of the cord 16 defining the hook of the stabilizer 10 and the second end of the cord defining the loop of the stabilizer 10.

Figure 1:
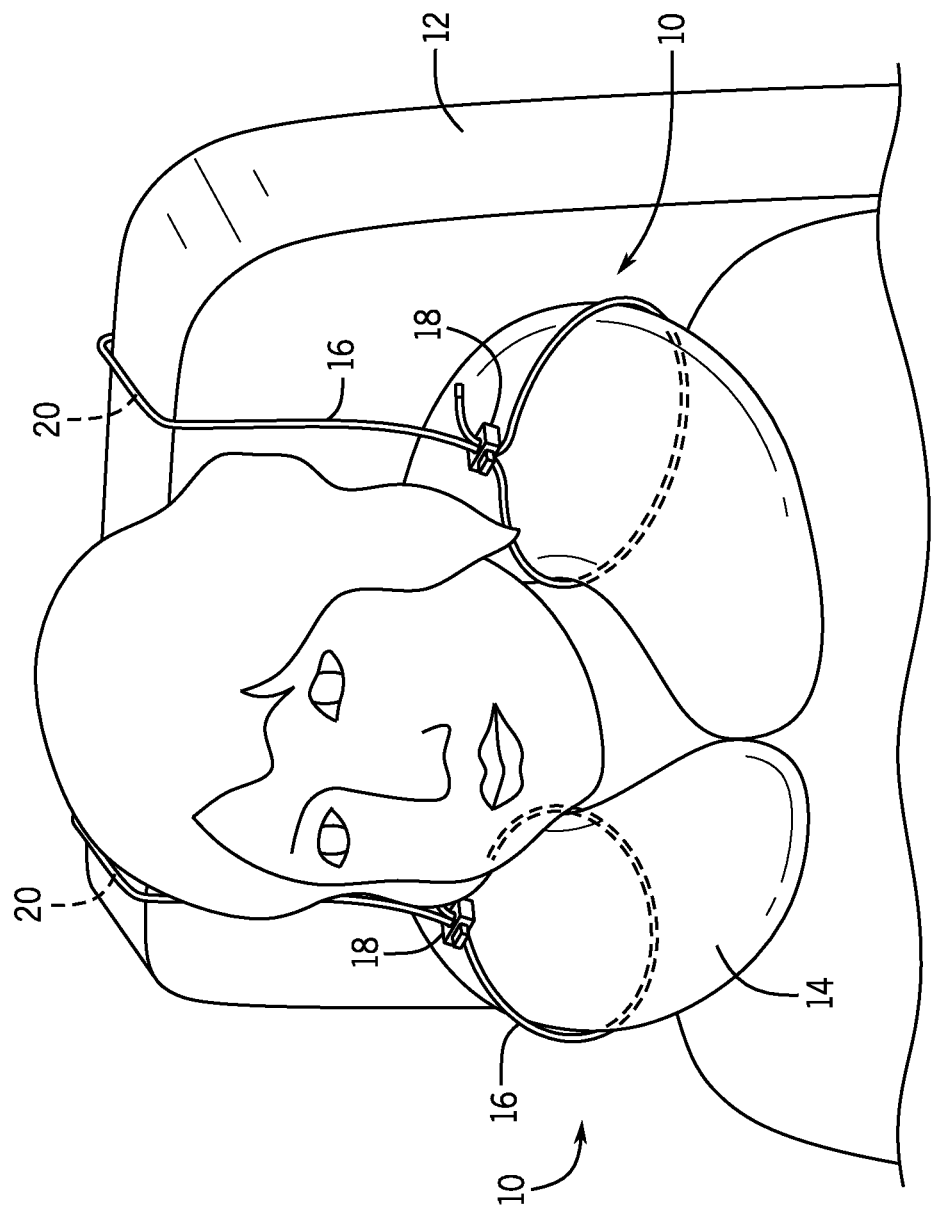
FIG. 1 is a front perspective view of one embodiment of the present invention, shown in use.
Figure 2:
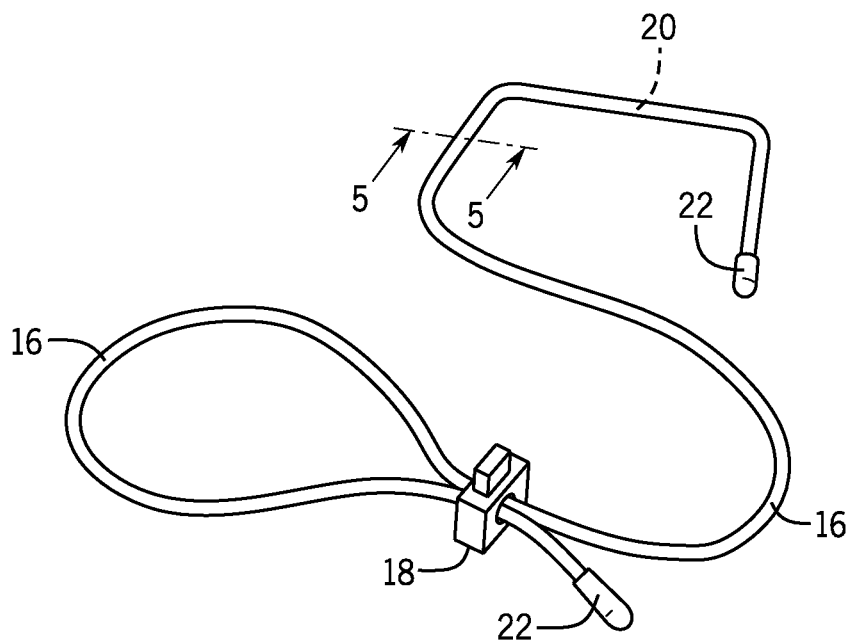
FIG. 2 is a perspective view of one embodiment of the present invention.
Figure 3:
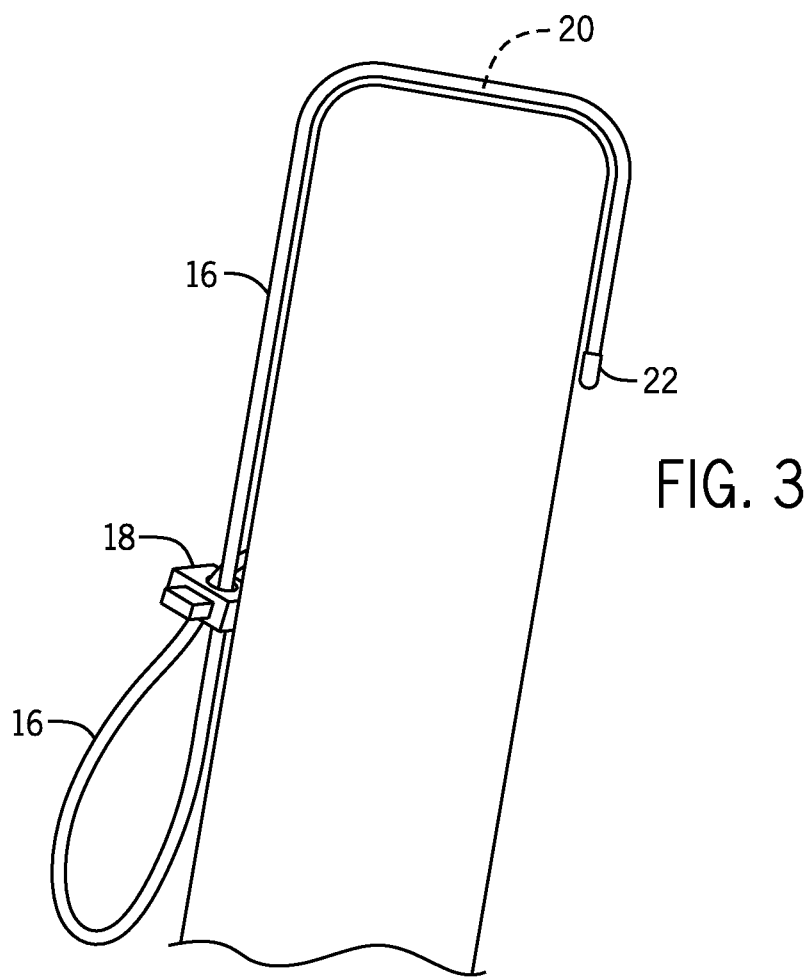
FIG. 3 is a side elevation view of one embodiment of the present invention, shown in use.

In embodiments, the bracket 20 may be configured to engage with a seat 12, such as the headrest of a seat as shown in FIG. 1, such as the seat of a plane, train, boat, automobile, or other vehicle. Additionally, the bracket 20 may be configured to engage with other surfaces, such as a high back chair or a hospital bed back. For example, as shown in FIG. 3, the bracket 20 may comprise a hook with two angles, such as substantially right angles, creating a hooked bracket configured to engage with the seat 12. In alternate embodiments, the bracket 20 may be rounded, U-shaped, or any other desired shape to mimic the seat 12 with which it is configured to engage. When the bracket 20 is squared off, the stability of the system may be improved.

The distal end of the stabilizer 10 may comprise a cord 16 formed into a loop, wherein the loop is configured to accommodate a pillow 14, as shown in FIG. 1. The loop may be formed by attaching the distal end of the cord 16 to a central portion of the stabilizer 10, such as at any desired position between the distal end and proximal end of the stabilizer 10. In some embodiments, the distal end may be attached to the central portion with an adjustable fastener, such as a cord clamp 18 which may be configured to slide allowing for the adjustment of the size of the loop. Thus, the loop may be tightened around the pillow 14 by adjusting the cord clamp 18 to make a smaller (or larger) loop.

As shown in the Figures, the stabilizer 10 may comprise a cord 16 having a distal end and a proximal end, wherein each end comprises a tip 22, such as a rubber tip. In other embodiments, the tip 22 may comprise any other suitable or desired material such as plastic. Proximate to the proximate end of the cord 16 may be a bracket 20 inserted into the cord 16, such that the cord 16 surrounds the bracket 20, as shown in FIG. 5.

The tip 22 positioned at the proximal end may ensure that the bracket 20 does not slip out of the cord 16. The tip 22 positioned at the distal end of the cord 16 may ensure that the cord 16 does not slip completely through the cord clamp 18.

In some embodiments, the system of the present disclosure comprises a plurality of stabilizers 10, such as about 2 stabilizers 10. A first stabilizer 10 may be positioned such that the bracket 20 is placed over the seat 12 and a first end of a pillow is inserted into the loop, wherein the loop is tightened around the pillow using the cord clamp 18, such that the first stabilizer 10 supports the weight of the pillow 14. A second support 10 may be similarly positioned to accommodate a second end of the pillow 14, while also supporting the weight of the pillow 14.

The system of the present disclosure may be made of any suitable material. For example, the cord 16 may comprise a plastic or fabric material. In some embodiments, the bracket 20 may comprise an aluminum wire or tubing, such as 4"×4"× ⅛" gauge bent aluminum brackets. The adjustable fastener may comprise any conventional fastener, such as a clip, a clamp, a snap, a button, a hook and loop fastener, or any other conventional fastener. The tips 22 may comprise any desired material and, in some embodiments, may comprise a rubber material.

When the system of the present disclosure is used with a pillow 10, as shown in FIG. 1, the system may prevent a pillow from moving, keeping the pillow in place, such as around a user's neck in the case of a travel pillow or against the headrest of a seat in the case of a standard pillow.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for holding a pillow in place, the system comprising:
    at least one stabilizer comprising:
        a distal end comprising a loop; and
        a proximal end comprising a hook,
    wherein:
        the stabilizer comprises:
            a cord having a first end and a second end; and
            a bracket inserted into the first end of the cord, the bracket being enveloped by the cord;
        the first end of the cord and the bracket define the hook;
        the second end of the cord defines the loop;
        the loop is adjustable in size and configured to engage with a pillow; and
        the hook is configured to engage with a headrest,
    wherein the second end of the cord does not have a bracket positioned therein.

2. The system of claim 1, further comprising a first tip positioned at the first end of the cord and a second tip positioned at the second end of the cord, the second tip being configured to prevent the bracket from falling out of the cord.

3. The system of claim 2, wherein the first tip and the second tip comprise a rubber material.

4. The system of claim 1, further comprising an adjustable fastener attaching the second end of the cord to a central portion of the cord positioned between the first end and the second end of the cord, wherein the adjustable fastener is configured to slide along a length of the cord to increase and decrease a size of the loop.

5. The system of claim 4, wherein the adjustable fastener is a cord clamp.

6. The system of claim 1, further comprising an adjustable fastener configured to engage with the stabilizer to adjust a size of the loop.

* * * * *